(12) United States Patent
Jeremiah (10) Patent No.: US 11,203,124 B2
(45) Date of Patent: Dec. 21, 2021

(54) ITEM HANDLING MANIPULATOR

(71) Applicant: INTELLIGRATED HEADQUARTERS, LLC, Mason, OH (US)

(72) Inventor: Grant R. Jeremiah, Steeleville, IL (US)

(73) Assignee: Intelligrated Headquarters, LLC, Mason, OH (US)

( * ) Notice: Subject to any disclaimer, the term of this patent is extended or adjusted under 35 U.S.C. 154(b) by 208 days.

(21) Appl. No.: 16/456,315

(22) Filed: Jun. 28, 2019

(65) Prior Publication Data

US 2020/0406477 A1 Dec. 31, 2020

(51) Int. Cl.
*B25J 15/08* (2006.01)
*B25J 9/16* (2006.01)

(52) U.S. Cl.
CPC ........... *B25J 15/086* (2013.01); *B25J 9/1664* (2013.01); *B25J 9/1697* (2013.01)

(58) Field of Classification Search
CPC ...... B25J 15/086; B25J 9/1664; B25J 9/1697; B25J 18/007; B25J 18/04; B25J 9/10
See application file for complete search history.

(56) References Cited

U.S. PATENT DOCUMENTS

| | | | |
|---|---|---|---|
| 9,623,570 | B1 | 4/2017 | Krahn et al. |
| 2013/0106127 | A1 | 5/2013 | Lipson et al. |
| 2017/0282363 | A1* | 10/2017 | Yamada ................. B25J 9/1612 |

FOREIGN PATENT DOCUMENTS

| | | | | |
|---|---|---|---|---|
| CN | 103831838 | A * | 6/2014 | |
| CN | 103831838 | A | 6/2014 | |
| CN | 106476026 | A | 3/2017 | |
| CN | 109261837 | A | 1/2019 | |
| CN | 109879047 | A * | 6/2019 | |
| CN | 109879047 | A | 6/2019 | |
| DE | 102016220643 | A1 * | 4/2018 | ......... B25J 15/0616 |
| DE | 102016220643 | A1 | 4/2018 | |
| EP | 3395732 | A1 | 10/2018 | |
| JP | H10217172 | A * | 8/1998 | |
| JP | 3356952 | B2 | 12/2002 | |
| WO | 2016/075424 | A1 | 5/2016 | |

OTHER PUBLICATIONS

Extended European Search Report issued in European Application No. 20181515.6 dated Dec. 22, 2020, 8 pages.
Office Action issued in Chinese Application No. 202010551036.4 dated Aug. 26, 2021, 16 pages.

* cited by examiner

*Primary Examiner* — Khoi H Tran
*Assistant Examiner* — Nhi Q Bui
(74) *Attorney, Agent, or Firm* — Alston & Bird LLP (57) ABSTRACT

An end of arm tool includes a rotating plate with a first slot and an end effector inserted through the first slot with a clearance to move the end effector within the first slot. Further, the rotating plate is adjusted to alter an orientation of the end effector to position the end effector at one of a plurality of different angles based on characteristics of object to be handled by the end effector.

20 Claims, 9 Drawing Sheets

Receive an input data related to characteristics of object to be handled by the end effector, wherein the characteristics includes at least one characteristic of the object.

904

Rotate a rotating plate to alter an orientation of the end effector

906

Position the end effector at one of a plurality of different angles based on the at least one characteristic of the object.

FIG. 9

ITEM HANDLING MANIPULATOR

TECHNOLOGICAL FIELD

Example embodiments of the present invention relates generally to a material handling system for handling items, and, more particularly, to manipulators used in the material handling system for manipulating one or more items in a material handling environment.

BACKGROUND

Material handling systems can convey, sort, and organize items (e.g. cartons, cases, containers, shipment boxes, totes, packages, and/or the like) at high speeds. Depending on a configuration of the material handling systems, the items may travel through the material handling systems in an unregulated manner, or may be repositioned, reoriented, and/or consolidated into a single stream of items on conveyors and/or other locations. Material handling systems may a conveyor controller and/or warehouse management system to facilitate organization of items being conveyed and/or handled.

SUMMARY

The following presents a simplified summary to provide a basic understanding of some aspects of the disclosed material handling system. This summary is not an extensive overview and is intended to neither identify key or critical elements nor delineate the scope of such elements. Its purpose is to present some concepts of the described features in a simplified form as a prelude to the more detailed description that is presented later.

Various example embodiments described herein, relates to an end of arm tool used for manipulating objects. The end of arm tool includes a rotating plate with a first slot and an end effector inserted through the first slot with a clearance to move the end effector within the first slot. The rotating plate is adjusted to alter an orientation of the end effector to position the end effector at one of a plurality of different angles based on characteristics of object to be handled by the end effector.

Various example embodiments described herein, relates to the end of arm which can be oriented at plurality of different angles including a right angle, an acute angle, and an obtuse angle relative to a rotating axis of the rotating plate.

Various example embodiments described herein, relates to the end of arm tool with the end effector having a first end and a second end, the first end being proximal to the rotating plate and the second end being distal from the rotating plate, and wherein the second end comprises a suction cup.

Various example embodiments described herein, relates to the end of arm tool with plurality of end effectors, each secured inside a respective first slot on the rotating plate.

Various example embodiments described herein, relates to the end of arm tool with a supporting plate positioned between the rotating plate and the suction cup, wherein the supporting plate comprises an aperture to receive a portion of the end effector.

Various example embodiments described herein, relates to the end of arm tool including the rotating plate which is rotated in a semi-circular rotational motion by one of a pneumatic actuator or an electric motor.

Various example embodiments described herein, relates to the end of arm tool with the plurality of end effectors are oriented at one of the plurality of different angles with respect to a rotating surface of the rotating plate during the semi-circular rotational-motion.

Various example embodiments described herein, relates to the end of arm tool including a non-rotating plate with a second slot coupled to the rotating plate, wherein a portion of the end effector is inserted through the second slot, and wherein the first slot partially overlaps with the second slot.

Various example embodiments described herein, relates to the end of arm tool, wherein the first slot is an angular slot and the second slot is a linear slot or vice-versa.

Various example embodiments described herein, wherein the characteristics of the object includes one of a size or shape of the object.

Various example embodiments described herein, wherein the second end of each end effector collectively forms a circular configuration when the first end of each end effector is inserted through the rotating plate. The rotating plate is adjusted to change a diameter of the circular configuration based on the characteristics of the object to be handled by the plurality of end effectors.

Various example embodiments described herein, wherein the rotating plate is capable of one of an incremental movement or a decremental movement.

Various example embodiments described herein, wherein the supporting plate acts as a fulcrum point for the end effector.

Various example embodiments described herein related to a robotic manipulator system. The robotic manipulator system includes a vision system to transmit an input data indicative of characteristics of an object to be handled by the robotic manipulator system. An end of arm tool includes a rotating plate with an angular slot. An end effector inserted through the angular slot with a clearance to move the end effector with the angular slot. A controller communicably coupled to the vision system, wherein the controller is configured to: adjust the rotating plate to alter an orientation of the end effector to position the end effector at one of a plurality of different angles based on the input data received from the vision system.

Various example embodiments described herein related to a robotic manipulator system including the vision system configured to: capture an image of the object to be handled by the end of arm tool.

Various example embodiments described herein related to a method for operating an end of arm tool. The method includes rotating a rotating plate to alter an orientation of an end effector and positioning the end effector at one of a plurality of different angles based on characteristics of object to be handled by the end effector.

Various example embodiments described herein related to a method for operating an end of arm tool. The method includes adjusting the rotating plate and subjecting the rotating plate to a semi-circular forward and reverse rotational-motion.

Various example embodiments described herein related to a method for operating an end of arm tool. The method includes receiving an input data related to characteristics of object to be handled by the end effector, wherein the characteristics includes at least one of a size or shape of the object.

Various example embodiments described herein related to a method for operating an end of arm tool. The method includes altering a first end of the end effector to a first configuration and a second end of the end effector to a second configuration.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Some embodiments of the present invention will now be described more fully hereinafter with reference to the accompanying drawings, in which some, but not all embodiments of the inventions are shown. Indeed, the disclosure may be embodied in many different forms and should not be construed as limited to the embodiments set forth herein; rather, these embodiments are provided so that this disclosure will satisfy applicable legal requirements. The terms "or" and "optionally" are used herein in both the alternative and conjunctive sense, unless otherwise indicated. The terms "illustrative" and "exemplary" are used to be examples with no indication of quality level. Like numbers refer to like elements throughout.

The components illustrated in the figures represent components that may or may not be present in various embodiments of the invention described herein such that embodiments may include fewer or more components than those shown in the figures while not departing from the scope of the invention.

Turning now to the drawings, the detailed description set forth below in connection with the appended drawings is intended as a description of various configurations and is not intended to represent the only configurations in which the concepts described herein may be practiced. The detailed description includes specific details for the purpose of providing a thorough understanding of various concepts with like numerals denote like components throughout the several views. However, it will be apparent to those skilled in the art that these concepts may be practiced without these specific details.

As used herein, the terms "manipulator," "end of arm tool", and similar terms may be used interchangeably to refer to a manipulator of robotic device within a material handling system in accordance with embodiments of the present disclosure. Thus, use of any such terms should not be taken to limit the spirit and scope of embodiments of the present disclosure.

In material handling environment, such as, but not limited to, distribution centers, warehouses, inventories, or shipping centers, various equipment such as, robotic arms, item manipulators, conveyor overhead units, and/or the like are used for performing various operations. For instance, these equipment's are used for manipulating items located in the material handling environment and/or in transit on some conveyors or truck trailers. Manipulation of the items referred herein, may involve performing operations such as, but not limited to, picking, re-orienting, placing, stacking, un-stacking, lifting, repositioning, or relocating the items.

Generally, a material handling system include robotic tools installed in the material handling environment, which are configured to perform the manipulation of items. These robotic tools are usually designed to pick an item of a particular shape. For instance, some robotic tools are designed to pick flexible shaped items like, envelopes, packages. Similarly, some robotic tools are designed to pick items having rigid shape like, containers, totes, cartons etc.

When manipulating these item, in some cases, a challenge exists when manipulating items of different sizes. For example, a manipulator which may be used to handle polybags may not be used to handle cartons owing to their size and shape requirements. In such instances, a wide variety of manipulators may be used to handle items of different sizes and shapes. Switching between manipulators in real-time when handle items of different sizes and shapes may be a tedious process requiring manual intervention. In this regard, operations within the material handling environment may slow down impacting overall throughput of the material handling system.

Various example embodiments described herein relates to, a manipulator with adjustable end effectors to handle items of different sizes and shapes. The manipulator includes a rotating plate with adjustment grooves/angular slots. The end effectors are secured inside the adjustment grooves/angular slots. In operation, the rotating plate is adjusted to alter an orientation of the end effectors to position the end effectors at different angles based on the size or shape of an item to be handled by the end effectors.

According to some example embodiments, the manipulator may be in communication with a vision system to receive data related to the shape and size of different items to be handled by the end effector. A controller of the manipulator may adjust the rotating plate in response to the data received from the vision system. The amount of adjustment of the rotating plate is based on the size or shape of the item to be handled by the manipulator. For example, when the manipulator is to handle a carton, the rotating plate may be adjusted to alter the end effector to a first configuration. On the other hand, when the manipulator is to handle a polybag, the rotating plate may be adjusted to alter the end effector to a second configuration. Thus, the manipulator described herein in accordance with various example embodiments, provides an effective handling of items of different sizes and shapes without a requirement of switching between manipulators in real-time, thereby, minimizing human intervention and increasing overall throughput of the material handling system.

In the following detailed description of exemplary embodiments of the disclosure, specific representative embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

Figure 1:
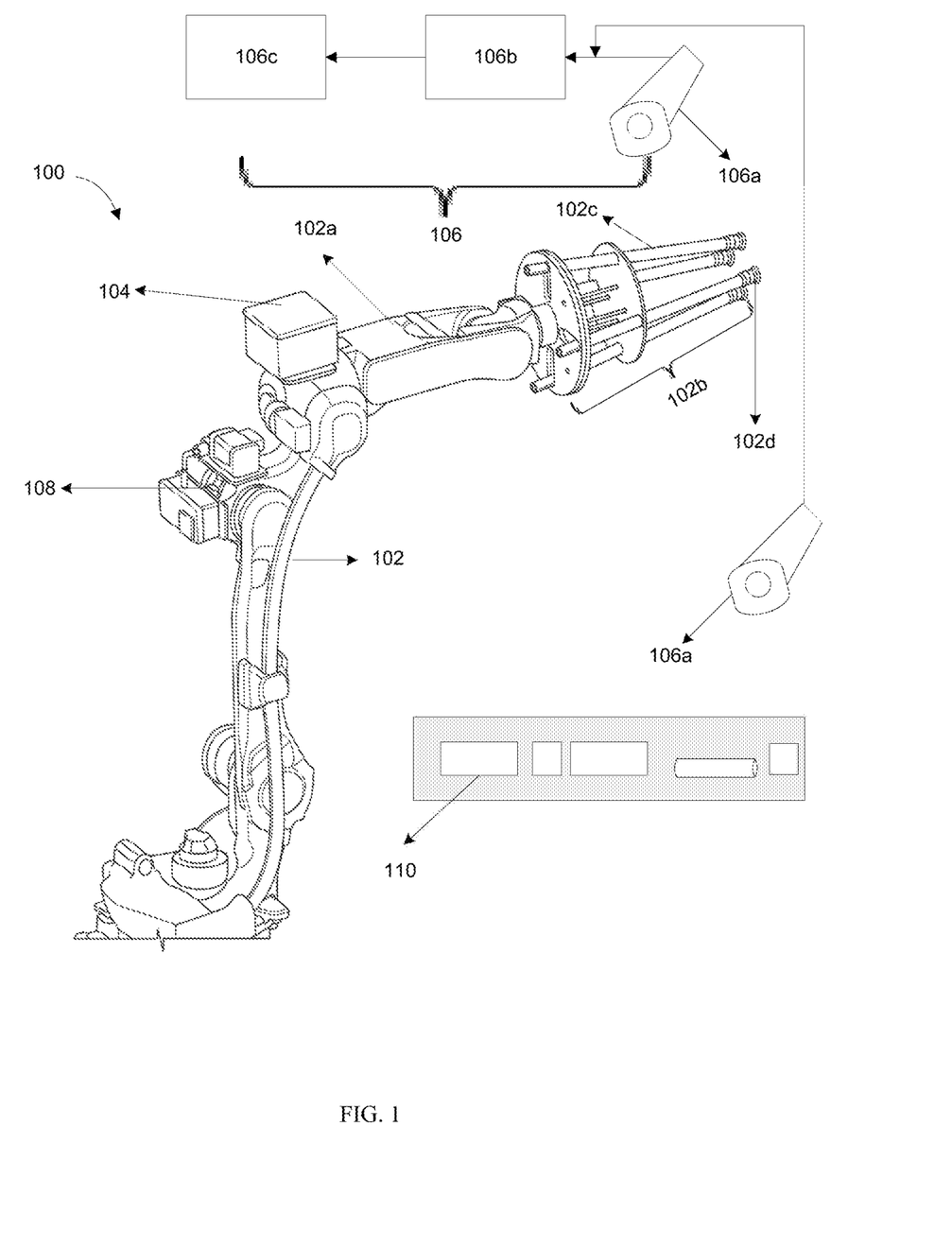
FIG. 1 illustrates a perspective view of a material handling system including a manipulator used for handling items in the material handling system, in accordance with some example embodiments described herein.

FIG. 1 illustrates a perspective view of a material handling system including a manipulator used for handling items in the material handling system, in accordance with some example embodiments described herein. The material handling system 100 includes a robotic device 102, a controller 104, a vision system 106, and a pneumatic manifold 108. The robotic device 102 includes a robotic arm 102*a* with a manipulator 102*b* or an end of arm tool 102*b* configured to handle items or objects 110 of different sizes and shapes. The robotic arm 102*a* is formed of plural joints with interconnecting sections which can be moved to simulate movements of a human arm. For example, the robotic arm 102*a* may include more than one "shoulder joint" and "wrist joint" to articulate the robotic arm 102*a* in more than one axis. Further, motors or other actuators, e.g., solenoids, are used to effect the motion of the plural joints with the interconnecting sections. In some example, the robotic arm 102*a* may include one or more sensors (not shown). The one or more sensors include, but not limited to, a proximity sensor, a distance measurement sensor, a vacuum sensor, a force sensor, weight sensor, a velocity sensor, a sensor to measure angular positions of the plural joints of the robotic arm 102*a*, and the like.

According to an embodiment, the manipulator 102*b* of the robotic arm 102*a* may include one or more controllers 104 communicably coupled to the manipulator 102*b*. In one embodiment, a controller 104 may be mounted on the robotic arm 102*a*. In another embodiment, the controller 104 may be located remotely in the material handling system away from the robotic device 102. For example, the controller 104 may include or be part of a teleoperator control station located any arbitrary distance from the robotic device 102. In some examples, the controller 104 may include provisions for operator input/output. In some examples, the controller 104 may be configured to allow the operator to plan and execute articulations of the manipulator 102*b*. Such articulations, in some embodiments, may be carried out autonomously, or semi-autonomously. As used herein, controllers, for example, may include processors such as a programmable microprocessor, microcomputer or multiple processor chip or chips that can be configured by software instructions (applications) to perform a variety of functions, including the functions of the various embodiments described above. In the various devices, multiple processors may be provided, such as one processor dedicated to wireless communication functions and one processor dedicated to running other applications. Typically, software applications may be stored in the internal memory before they are accessed and loaded into the processors. The processors may include internal memory sufficient to store the application software instructions. In many devices, the internal memory may be a volatile or nonvolatile memory, such as flash memory, or a mixture of both. For the purposes of this description, a general reference to memory refers to memory accessible by the processors including internal memory or removable memory plugged into the various devices and memory within the processors.

According to an embodiment, the vision system 106 is capable of capturing, sensing and transmitting data related to the characteristics of the object or the item 110 to be handled by the manipulator 102*b*. The vision system 106 may also include a network of imagers, sensors, cameras, identification systems, and the like, for determining characteristics of objects or items 110 in material handling environment. In accordance with an embodiment, the vision system 106 may be detachably coupled to the manipulator 102*b*. In accordance with another embodiment, the vision system 106 may be located remotely and communicably coupled to the robotic device 102 to communicate with the controller 104 of the robot arm 102*a*.

In accordance with the embodiments of the present disclosure, the characteristics of the objects or items 110 may include, but is not limited to, size, shape, weight, position, edge detection, marker and/or label detection, and the like. For example, the vision system 106 may include a vision sensor or a camera 106*a* and an image processing unit 106*b*. The camera 106*a* may capture one or more images of the objects or items 110 to be handled by the manipulator 102*b* and the image processing unit 106*b* may process the one or more images to obtain the characteristics of the objects, for example, size or shape of the objects. The image processing unit 106*b* may transmit the obtained characteristics of the objects or items to the controller 104 via a transceiver circuit 106*c*. In some examples, the transceiver circuit 106*c* may transmit the obtained characteristics as input signals to the controller 104 via a wireless or radio transmission system. The input signals may be in the form of a combination of binary values. The binary values may correspond to a characteristic of the object, for example, size of the object.

In operation, the vision system 106 provides an input signal indicative of the characteristic of the object to the controller 104. The input signal may be indicative of either the size or shape of the object. For example, the input signal may be a binary input value '1' indicative of a particular object size. The controller 104 may receive the binary input value and control the manipulator 102*b* based on the binary input value. More particularly, the controller 104 controls one or more end effectors 102*c* attached to the manipulator 102*b* in accordance with the binary input value.

According to an embodiment, the one or more end effectors 102*c* of the manipulator 102*b* can be suction tubes that carry a suction force from a vacuum pump (not shown) to the suction cups 102d. In FIG. 1, four suction tubes are provided which can provide the suction force to the suction cups 102d. The suction force to the suction cups 102b can be controlled by the pneumatic manifold 108 positioned on the robotic arm 102a. The vacuum pump is operated by well-known pumps in the art, for example, mechanical pumps using a rotary system or venturi vacuum pumps. For example, the controller 104 of the robotic device 102 may be configured to activate the vacuum pump to cause the suction cups 102d to apply suction to an object at regulated pressure levels using the pneumatic manifold 108. Example embodiments of the construction of manipulator and operation of the manipulator in response the input signals received from the vision system are explained further in conjunction with FIGS. 2-4.

Figure 2:
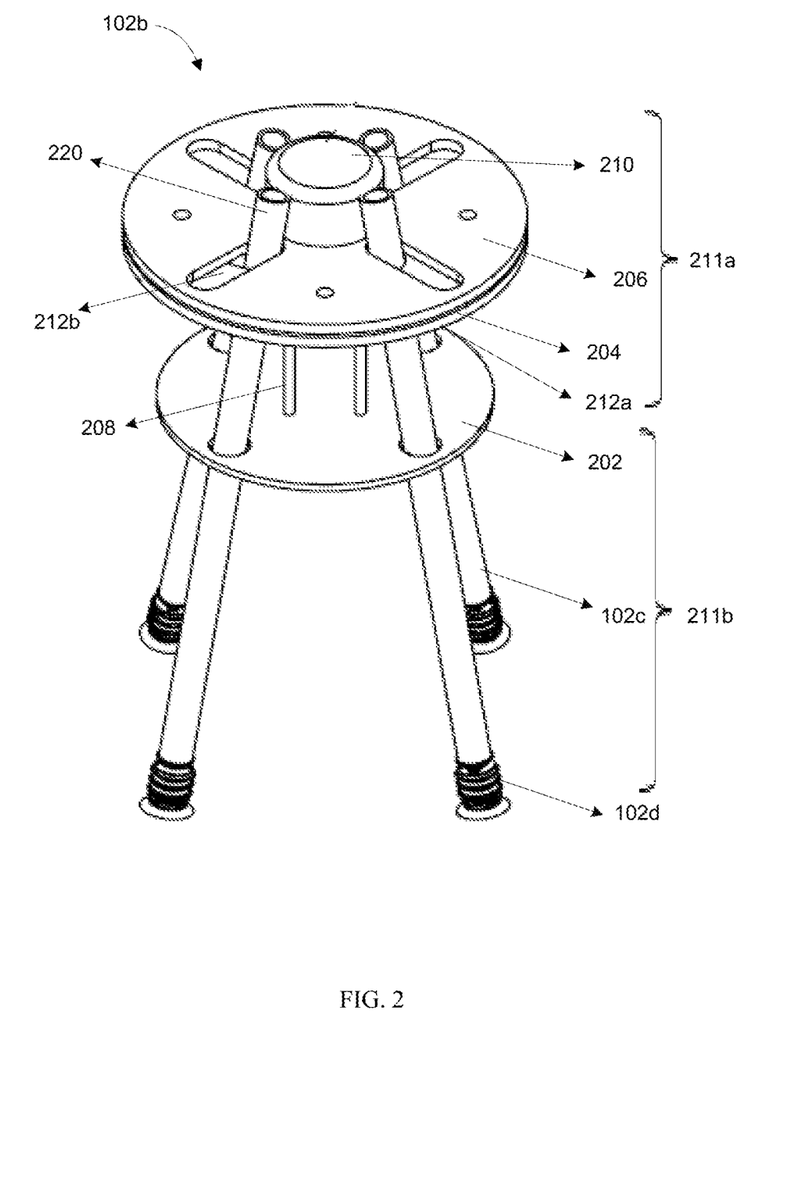
FIG. 2 illustrates a perspective view of a manipulator with end effectors used for handling the items in the material handling system in a first configuration, in accordance with some example embodiments described herein.

FIG. 2 illustrates a perspective view of the manipulator of FIG. 1 with end effectors used for handling the items in the material handling system in a first configuration, in accordance with some example embodiments described herein. In FIG. 2, the manipulator 102b detached from a robotic arm 102a is shown. The manipulator 102b includes the end effectors 102c, the suction cups 102d, a support plate 202, a rotating plate 204, a non-rotating plate 206, one or more support rods 208 and an actuator 210. The manipulator 102b handles objects of different sizes and shapes in the material handling environment by using the end effectors that facilitate in grasping the object, stabilizing the object, re-orienting the object and various other desired tasks. In FIG. 2, at one end of each end effector 102c, a suction cup 102d is provided. The suction cup 102d can act as a gripper for holding or grasping the objects of different sizes and shapes handled by the manipulator 102b. According to an embodiment, the end effectors 102c may include other type of grippers, which may include, but not limited to, pneumatic grippers, hydraulic grippers, electro-servo grippers, mechanical grippers, and magnetic grippers. Each manipulator 102b may have a grip strength which is based on the size of the suction cup 102d, the vacuum force of the suction cup 102d and the number of suction cups 102d employed. In the FIG. 2, the grip strength for the manipulator 102b is provided by four end effectors 102c with four suction cups 102d, however, is conceivable are other arrangements in which the manipulator 102b includes more or less than four end effectors 102c based on the objects to be handled in the material handling environment.

In FIG. 2, the rotating plate 204 is positioned at one end 211a of the end effectors 102c distal from the suction cups 102d. Each of the end effector 102c is attached to the rotating plate 204 with a clearance to move each of the end effector 102c along with rotation of the rotating plate 204. For example, each of the end effector 102c are inserted through the rotating plate 204 from a first side 212a of the rotating plate 204 and protrudes out from a second side 212b of the rotating plate 204 in a direction substantially parallel to a rotating axis 215 of the rotating plate 204. The first side 212a may be a side facing the suction cups 102d. The second side 212b may be the side opposite to the first side 212a and facing the robotic arm 102a. Each of the end effector 102c is substantially orthogonal to a rotating surface of the rotating plate 204.

In FIG. 2, the support plate 202 is positioned at the other end 211b of the end effectors 102c proximal to the suction cups 102d and at a distance away from the rotating plate 204. According to an embodiment, the support plate 202 is provided to support the rotating plate 204. For example, the one or more support rods 208 may be provided between the support plate 202 and the rotating plate 204 to support the rotating plate 204. For example, the one or more support rods 208 may be positioned equidistant from a center of the support plate 202 and the rotating plate 204. According to another embodiment, the support plate 202 acts as a fulcrum point for the rotating plate 204. According to another embodiment, the support plate 202 maintains a minimum gap between each of the end effectors 102c during the rotation of the rotating plate 204 and prevents the end effectors 102c colliding with each other during the rotation.

In FIG. 2, the non-rotating plate 206 is shown sandwiched along with the rotating plate 204. According to an embodiment, the non-rotating plate 206 may be placed at a negligible distance away from the rotating plate 204. The non-rotating plate 206 is a stationary fixed plate. According to an embodiment, the non-rotating plate 206 and the rotating plate 204 are coupled with each other with a clearance such that the rotating plate 204 is able to rotate relative to the non-rotating plate 206. A portion of the end effector 102c protruding out from the second side 212b of the rotating plate 204 is further inserted into the non-rotating plate 206 with a clearance and protrudes out from the non-rotating plate 206 to attach to the robotic arm 102b.

In FIG. 2, the actuator 210 is shown coupled to a top of the non-rotating plate 206. The actuator 210 drives the rotation of the rotating plate 204. In some examples, the actuator 210 may be a pneumatic actuator which includes a piston and cylinder arrangement with the piston operating under the influence of compressed air to provide rotary motion to the rotating plate 204. In some examples, the actuator 210 may be an electric motor which drives the rotating plate 204. Example embodiments of the construction of the rotating plate, non-rotating plate and support plate of the manipulator are explained in conjunction with FIGS. 3-5.

Figure 3:
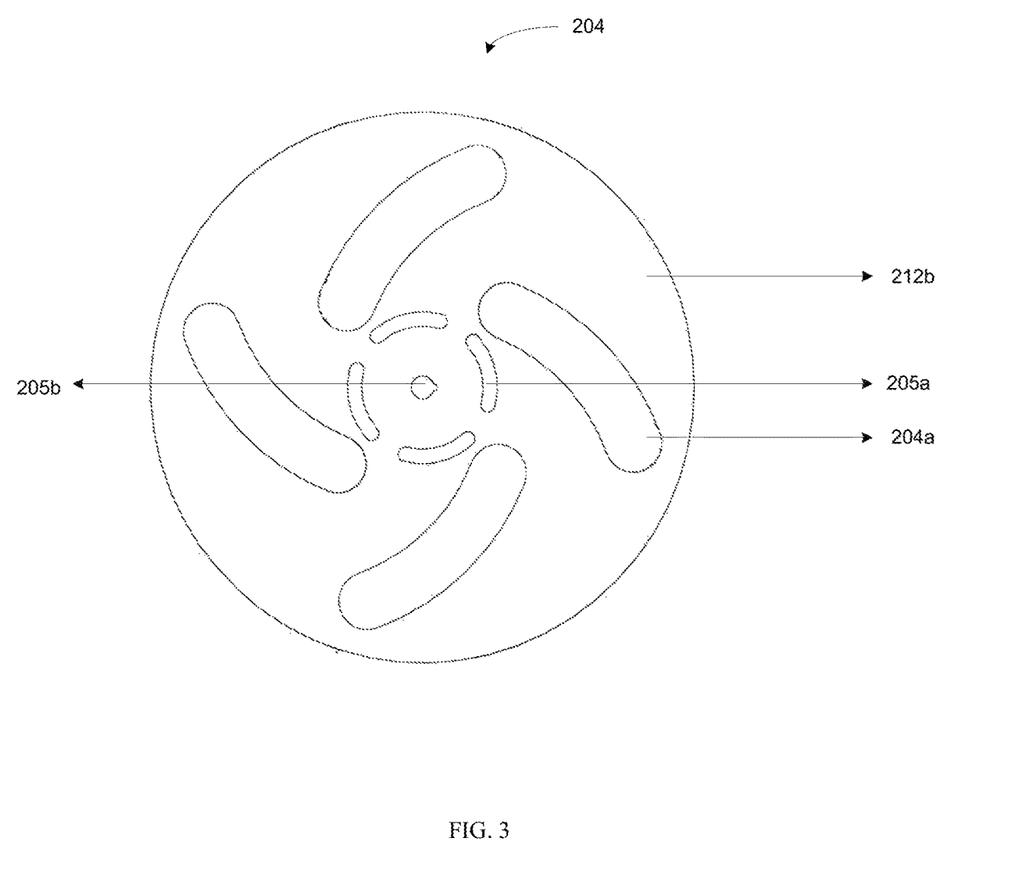
FIG. 3 illustrates a top view of a rotating plate of the manipulator, in accordance with some example embodiments described herein.

FIG. 3 illustrates a top view of the rotating plate of the manipulator, in accordance with some example embodiments described herein. The rotating plate 204 includes one or more first slots 204a. The one or more first slots 204a may be angular slots. For example, the angular slots are arcuate through-holes through which the end effectors 102c are inserted. Each end effector 102c may be inserted in their respective angular slot 204a. The angular slots 204a are equidistantly spaced apart from each other and from the center of the rotating plate 204. In FIG. 3, four angular slots 102c are shown in the rotating plate 204 to receive four end effectors 102c with a clearance. These end effectors 102c pass through the angular slots 204a from a first side 212a of the rotating plate 204 and protrude out from the second side 212b. The end effectors 102c are held within the angular slots 204a with a clearance such that the end effectors 102c may move along with the rotation of the rotating plate 204. Further, the rotating plate 204 may include a first set of apertures 205a to receive the support rods 208 as shown in FIG. 2. According to an embodiment, the first set of apertures 205a are through holes smaller than the angular slots 204a inside which the support rods 208 may be inserted. The rotating plate 204 further includes a center hole 205b in which a portion of the actuator 210 is coupled by interference fit or by adhesives or using fasteners.

Figure 4:
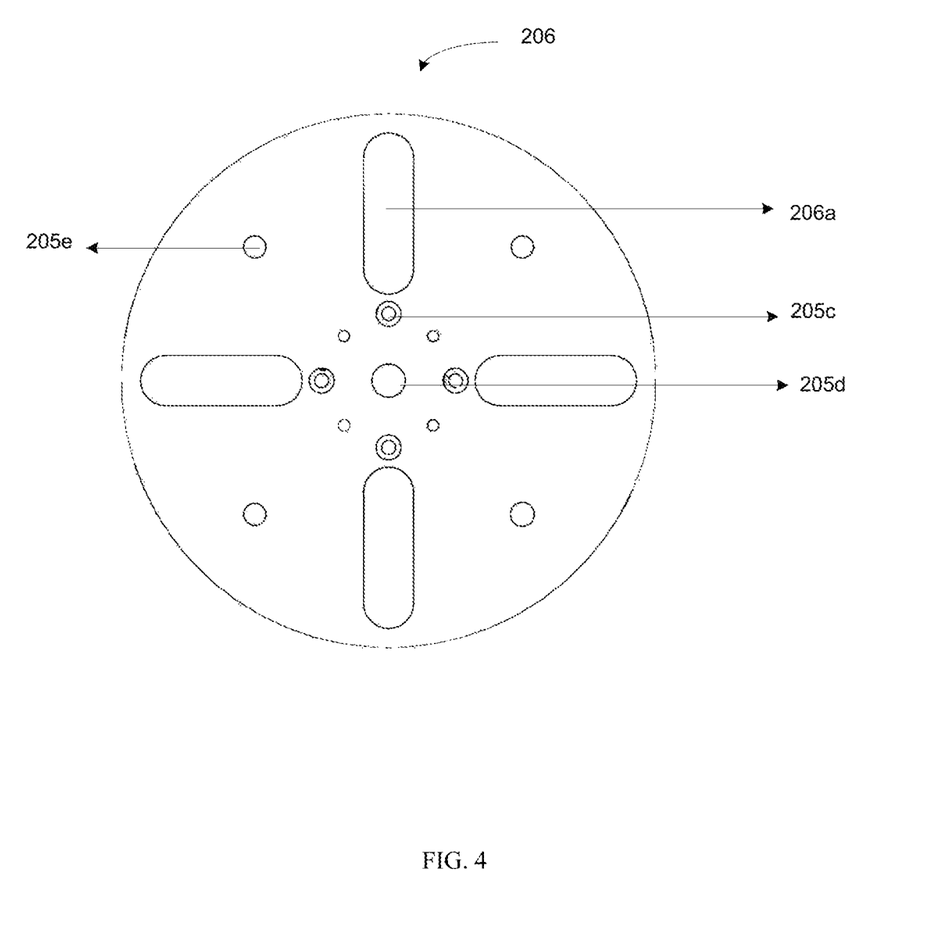
FIG. 4 illustrates a top view of a non-rotating plate of the manipulator, in accordance with some example embodiments described herein.

FIG. 4 illustrates a top view of the non-rotating plate 206 of the manipulator, in accordance with some example embodiments described herein. The non-rotating plate includes one or more second slots 206a. The second slots 206a may be linear slots. For example, the linear slots 206a are straight through-holes through which the end effectors 102c are inserted. According to an embodiment, the linear slots 206a at least partially overlap with the angular slots 204a of the rotating plate 204. Overlapping of the linear slots 206a and the angular slots 204a are shown in FIGS. 3 and 4. The end effectors 102c are positioned within overlapping portions of the linear slots 206a and the angular slots 204a. The linear slots 206a are provided to restrict a movement of end effectors 102c within the linear slots 206a when the end effectors 102c are forced to move by the rotation of the rotating plate 204a. For example, the end effector 102c traverses a distance equal to a length of the linear slot 206a when the end effector 102c is subjected to a rotational motion by the rotating plate 204. According to an embodiment, the non-rotating plate may include a second set of apertures 205c, a center hole 205d and an additional set of apertures 205e. The second set of apertures 205c receive the support rods 208. The center hole 205d may receive a portion of the actuator 210 coupled by interference fit or by adhesives or using fasteners. The additional set of apertures 205e may be used for coupling the rotating plate 204 with non-rotating plate 206 with a clearance.

Figure 5:
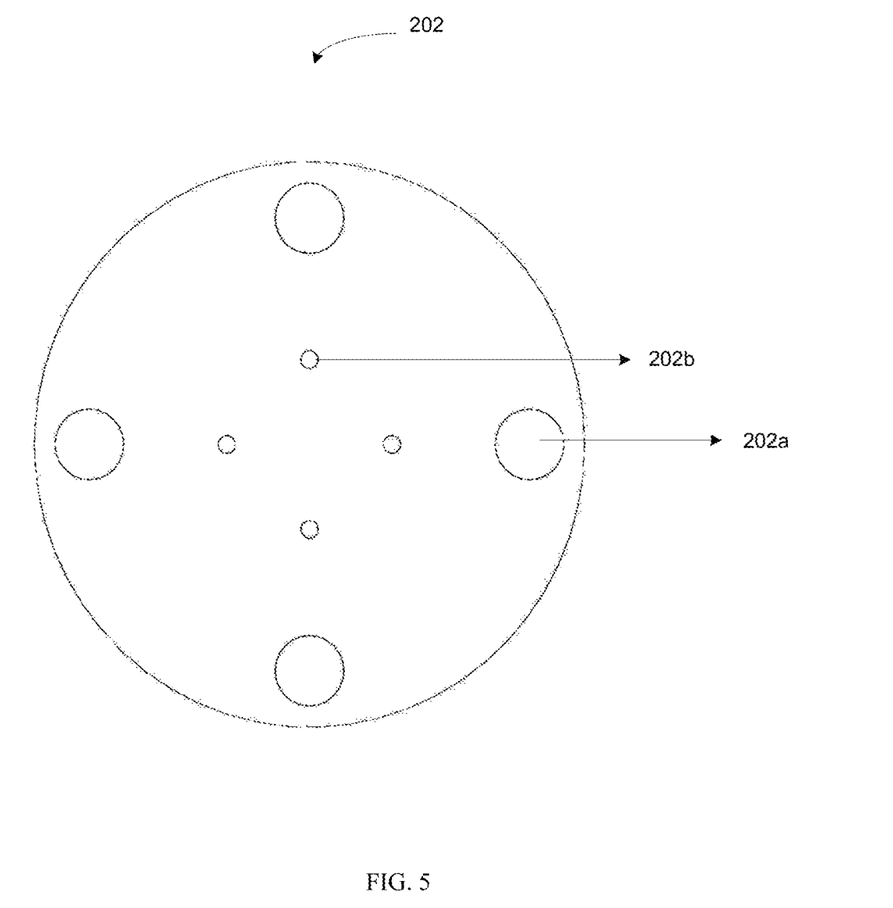
FIG. 5 illustrates a top view of a support plate of the manipulator, in accordance with some example embodiments described herein.

FIG. 5 illustrates a top view of a support plate of the manipulator, in accordance with some example embodiments described herein. The support plate 202 include third set of apertures 202a and fourth set of apertures 202b. The third set of apertures 202a may be through-holes and the fourth set of apertures 202b may be blind holes. One end of the end effectors 102c opposite to the end fixed to the rotating plate 204 is inserted through and protrude out from the third set of apertures 202a. Similarly, one end of the support rods 208 opposite to the end fixed to the rotating plate 204 is secured inside the fourth set of apertures 202b. The end effectors 102c are attached to the third set of apertures 202a by interference fit to hold the end effectors 102c intact within the third set of apertures 202a. Similarly, the support rods 208 are attached to the fourth set of apertures 202b by interference fit or by adhesives or using fasteners. Example embodiments of the control of the manipulator 102b using the rotating plate 204 and the non-rotating plate 206 is explained in conjunction with FIG. 6.

Figure 6:
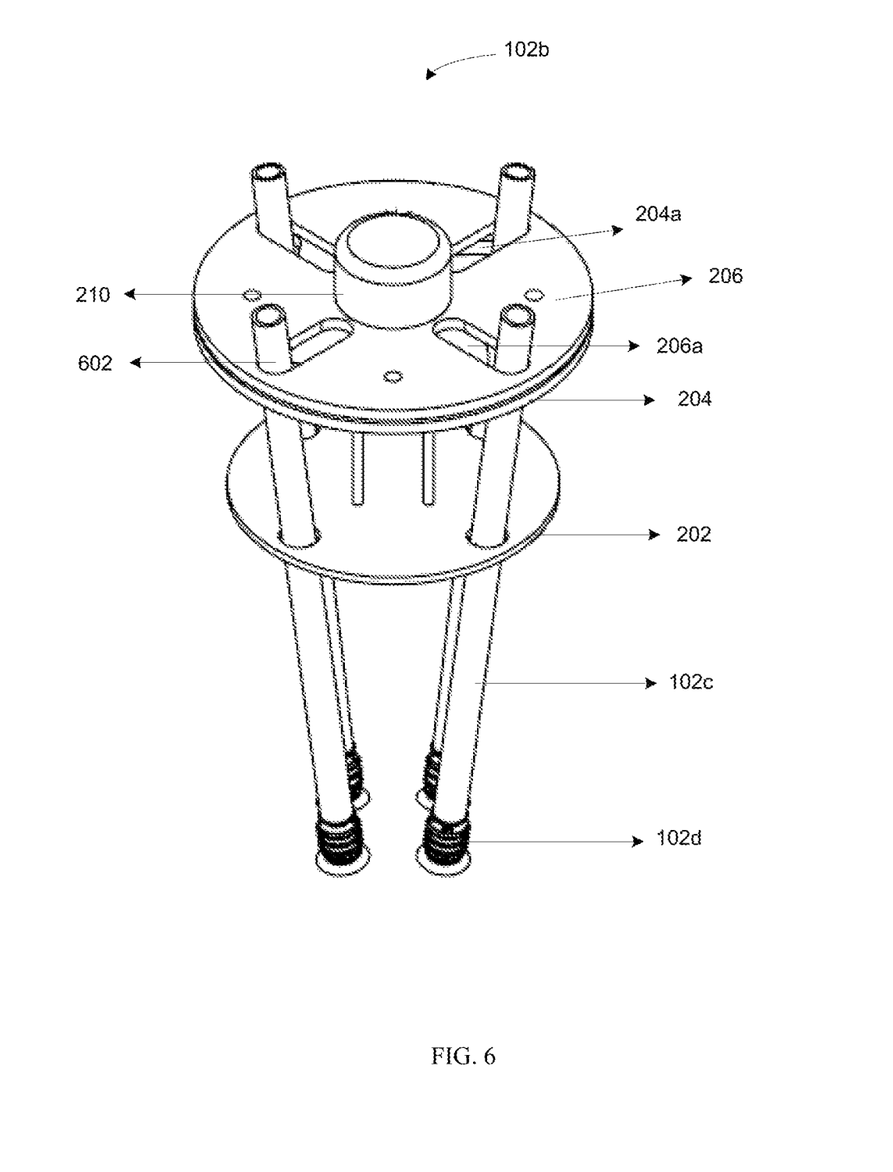
FIG. 6 illustrates a perspective view of a manipulator with end effectors in a second configuration, in accordance with some example embodiments described herein.

FIG. 6 illustrates a perspective view of a manipulator with end effectors in a second configuration, in accordance with some example embodiments described herein. In material handling environment, the end effectors 102c handle different types of objects of varying characteristics. According to an embodiment, the end effectors 102c are oriented at different angles and configurations using the rotating plate 204 and the non-rotating plate 206 in accordance with the characteristics of objects to be handled by the end effectors 102c. The orientation of the end effectors 102c is altered to position the end effectors 102c at one of a plurality of different angles or configurations.

In operation, the actuator 210 rotates the rotating plate 204 subjecting the angular slots 204a of the rotating plate 204 to undergo a semi-circular forward and reverse rotational-motion. As a result of the semi-circular forward and reverse rotational-motion of the angular slots 204a, the end effectors 102c undergo a linear motion within the linear slots 206a of the non-rotating plate 206. The amount of linear motion of the end effectors 102c within the linear slots 206a depends on the amount of rotation of the angular slots 204a. For example, the end effectors 102c may move from a forward position to a backward position for forming the second configuration as shown in FIG. 6 and from the backward position to the forward position for forming the first configuration as shown in FIG. 2 inside the linear slot 206a traversing the length of the linear slot 206a when the angular slots 204a are subjected to the semi-circular forward and reverse rotational-motion.

For example, if the end effectors 102c are used to handle an object of a larger size, such as a carton, then the actuator 210 actuates the rotating plate 204 to rotate the angular slots 2024a in a reverse rotational-motion to subject the end effectors 102c to a linear movement from a forward position to backward position. Such linear movement would alter the orientation of the end effectors 102c to handle objects of larger size. In the example, one end of the end effector 102c connected to the rotating plate 204 and the non-rotating plate 206 is subjected to the linear motion or movement to alter the orientation of the other end of the end effector 102c. As a result of altering the orientation of the other end, the suction cups 102d of the end effectors 102c at the other end are altered to a first configuration suitable for efficient handling of larger items, such as the carton.

On the other hand, in the example embodiment as shown in FIG. 2, when the end effectors 102c are used to handle an object of a smaller size, such as a polybag, then the actuator 210 actuates the rotating plate 204 to rotate the angular slots 204a in a forward rotational-motion to subject the end effectors 102c to a linear movement from a backward position to a forward position. Such linear movement would alter the orientation of the end effectors 102c to handle objects of smaller size. In the example, one end of the end effector connected to the rotating plate 204 and the non-rotating plate 206 is subjected to a linear motion or movement to alter the orientation of the other end of the end effector 102c. As a result of altering the orientation of the other end, the suction cups 102d on the other end of the end effectors 102c are altered to a second configuration suitable for efficient handling of smaller items, such as the polybag.

In both scenarios as shown in FIGS. 2 and 6, the non-rotating plate 206 is held stationary and the rotating plate 204 is rotated by the actuator 210 relative to the non-rotating plate 206. The rotational motion of the rotating plate 204 is translated into a linear motion of the end effectors 102c. During, the rotational motion, the angular slot 204a pushes the end effector 102c to move from a first position 220 as shown in FIG. 2 to a second position 602 as shown in FIG. 6 within the linear slot 206a. According to an embodiment, the rotational motion of the rotating plate 204 may be a step-wise incremental or a step-wise decremental rotational motion in which the angular slot 204a pushes the end effector 102c to move it to intermediate positions between the first position and the second position. In this regard, the end effectors 102c may be altered to different positions within the linear slot 206a in order to handle items of different sizes and shapes.

Figure 7:
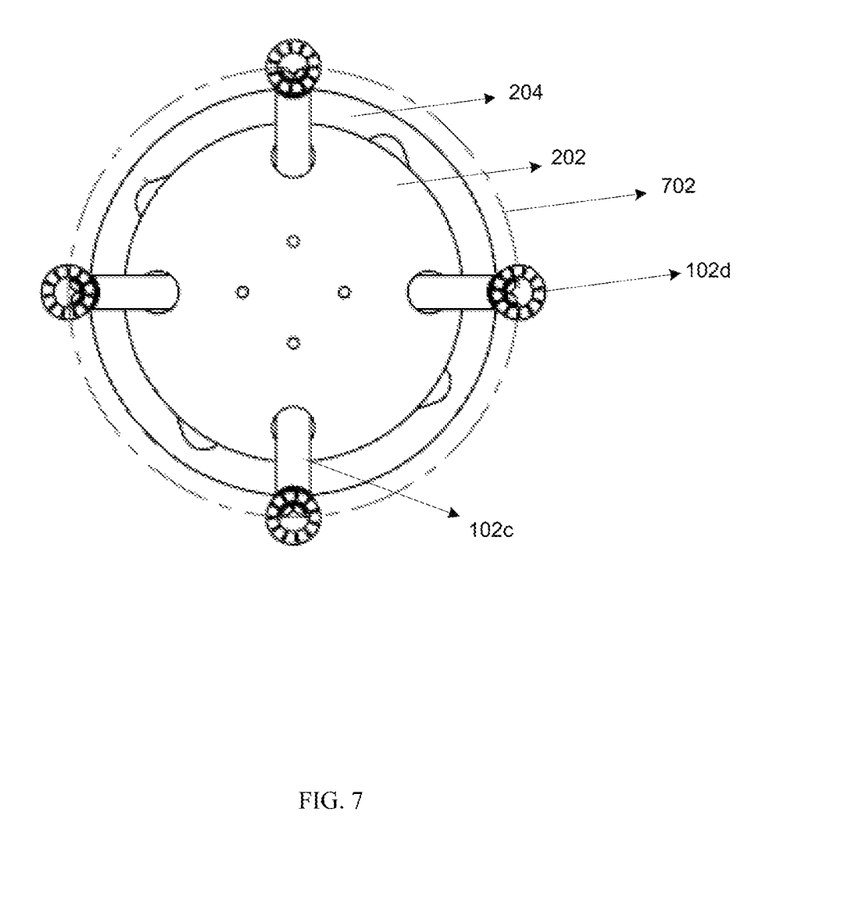
FIG. 7 illustrates a bottom view of the end effectors forming a first circular configuration, in accordance with some example embodiments described herein.
Figure 8:
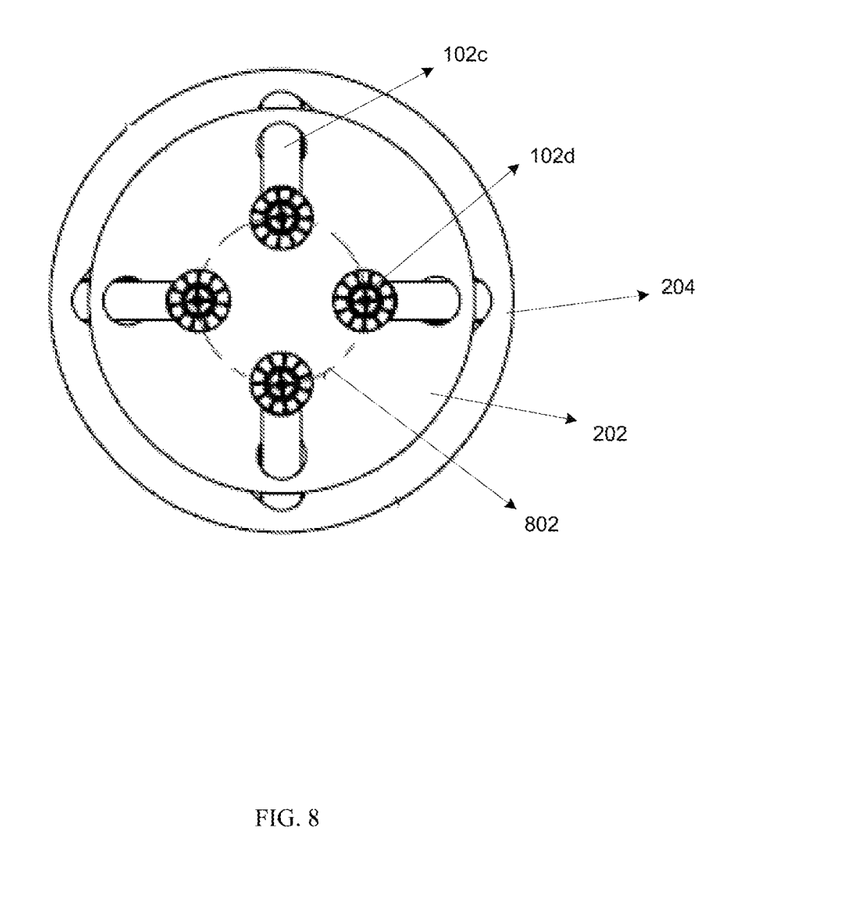
FIG. 8 illustrates a bottom view of the end effectors forming a second circular configuration, in accordance with some example embodiments described herein.

In some examples, the first configuration and the second configuration may be circular configurations of varying diameters. FIGS. 7 and 8 illustrates a bottom view of the end effectors forming a first circular configuration and a second circular configuration, in accordance with some example embodiments described herein. Such circular configurations are formed by the end effectors 102c collectively during the linear movement within the linear slot 206a. For example, when the rotating plate 204 is actuated, the angular slots 204a engages with the end effectors 102c to linearly move each end effector 102c to a desired position within the linear slot 206a. As a result of positioning of end effectors 102c within the linear slot during the linear movement, a diameter of the circular configuration formed collectively by the end effectors 102c are altered. As shown, the diameter of the first circular configuration 702 of FIG. 7 is larger compared to the diameter of the second circular configuration 802 shown in FIG. 8. The diameter variations are effected by the linear movement of the end effector 102c within the linear slot 206a and the rotational movement of the arcuate slots 204a. According to another embodiment, the end effectors 102c may be altered to a plurality of other configurations in addition to the circular configurations based on characteristics of the objects to be handled by the end effectors 102c.

Figure 9:
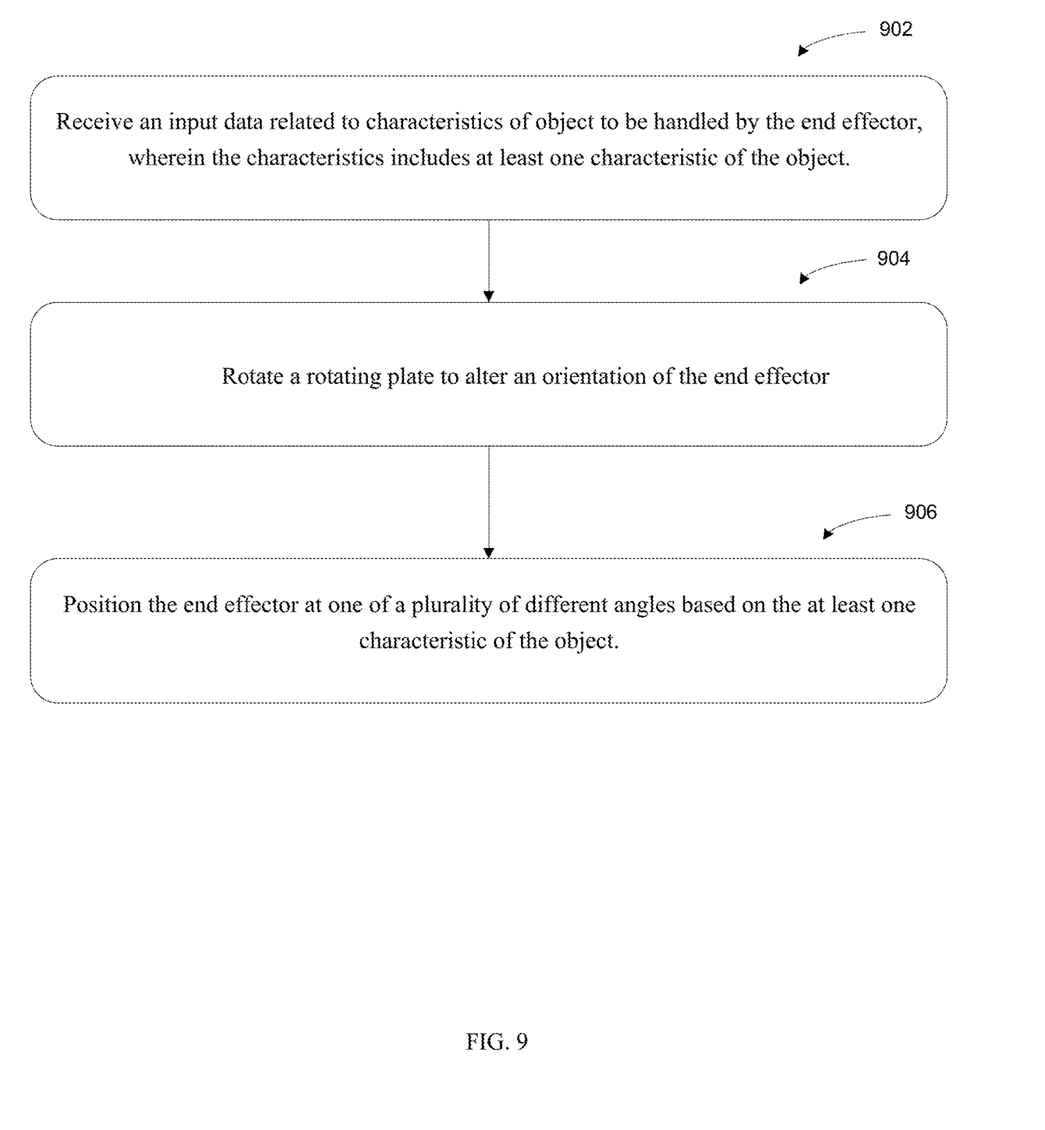
FIG. 9 illustrates a method of handling items in the material handling system using the manipulator of FIG. 2, in accordance with some example embodiments described herein.

FIG. 9 illustrates a method of handling items in the material handling system using the manipulator of FIG. 2, in accordance with some example embodiments described herein. At step 902, a controller receives an input data related to characteristics of object to be handled by an end effector of the manipulator. The characteristics includes either a size or shape of the object. For example, a vision system which includes, a 3-dimensional (3D) or 2-dimensional (2D) camera, to capture images of objects placed in an object pile or in a conveyor. The vision system process the 2D or 3D image data captured by the 2D or 3D camera for determining the characteristics of the object, for example, size or shape of the object. The vision system may then transmit the characteristics of the object to a controller in the form of binary values. The binary values may be values equivalent to the size or shape of the object processed by the vision system. In some examples, equivalent binary values for various sizes or shapes of the object may be stored in a memory of the vision system or in a remote server in the form of a look up table. When the vision system processes the 3D image data or 2D image data of the object to obtain the size of the object, an equivalent binary value for the corresponding size may be retrieved from the look up table in the memory and transmitted to the controller. Further, at step 904, the controller rotates a rotating plate attached to the manipulator to alter an orientation of the end effector. As discussed in the above example, the controller may receive binary value "1" which may indicate that the rotating plate should undergo a 180-degree rotation to alter the orientation of the end effector in order to handle the objects recognized by the vision system. In another example, the controller may receive binary value "0" which may indicate that the rotating plate need not be rotated and may be maintained in the current position to handle the objects recognized by the vision system. In this regard, the controller may periodically rotate the rotating to alter the orientation of the end effector in response to the size or shape of the object recognized by the vision system. In this regard, the binary values stored in the look up table are indicative of the amount or degree of rotation of the rotating plate. At step 906, the controller positions the end effector at a plurality of different angles based on the amount of rotation of the rotating plate. The amount of rotation being proportional to the at least one characteristic of the object, which for example, may be the size or shape of the object. The end effectors may be oriented in at least one of a right angle, an acute angle, and an obtuse angle relative to a rotating axis of the rotating plate. For example, the controller may receive the binary value "1" which may indicate that the rotating plate can be rotated such the end effectors are collectively positioned at obtuse angles relative to the rotating axis of the rotating plate and the binary value "0" may indicate that the rotating plate can be rotated such the end effectors are collectively positioned at acute angles relative to the rotating axis of the rotating plate. In the absence of a binary value input of either 1 or 0, the end effectors may be positioned at right angles relative to the rotating axis of the rotating plate. In this manner, the end effectors are positioned at different angles based on the characteristics of the objects recognized by the vision system. Therefore, the manipulator may be flexible to handle objects of any size or shape by orienting the end effectors to any desired position or angles based on the size or shape of the object interpreted by the vision system.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a non-transitory processor-readable, computer-readable, or server-readable medium or a non-transitory processor-readable storage medium. The steps of a method or algorithm disclosed herein may be embodied in a processor-executable software module or processor-executable software instructions which may reside on a non-transitory computer-readable storage medium, a non-transitory server-readable storage medium, and/or a non-transitory processor-readable storage medium. In various embodiments, such instructions may be stored processor-executable instructions or stored processor-executable software instructions. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory processor-readable storage medium and/or computer-readable medium, which may be incorporated into a computer program product.

The foregoing description of an embodiment has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. Although only a limited number of embodiments of the invention are explained in detail, it is to be understood that the invention is not limited in its scope to the details of construction and arrangement of components set forth in the preceding description or illustrated in the drawings. The invention is capable of other embodiments and of being practiced or carried out in various ways. Also, in describing the embodiment, specific terminology was used for the sake of clarity. It is to be understood that each specific term includes all technical equivalents which operate in a similar manner to accomplish a similar purpose.

The invention claimed is:

1. An end of arm tool comprising:
   a rotating plate with a first slot;
   an end effector inserted through the first slot with a clearance to move the end effector within the first slot; and
   a supporting plate positioned between one end of the end effector and the rotating plate, wherein the end effector is inserted through an aperture in the support plate,
   wherein the rotating plate is adjusted to alter an orientation of the end effector relative to a plane of the rotating plate to position the end effector at one of a plurality of different angles based on characteristics of an object to be handled by the end effector.

2. The end of arm tool of claim 1, wherein the plurality of different angles comprises at least one of a right angle, an acute angle, and an obtuse angle relative to a rotating axis of the rotating plate.

3. The end of arm tool of claim 1, wherein the end effector comprises a first end and a second end, the first end being proximal to the rotating plate and the second end being distal from the rotating plate, and wherein the second end comprises a suction cup.

4. The end of arm tool of claim 1, wherein the end effector is one of a plurality of end effectors, each secured inside a respective first slot on the rotating plate.

5. The end of arm tool of claim 1, further comprises:
   a supporting plate positioned between the rotating plate and a suction cup, wherein the supporting plate comprises an aperture to receive a portion of the end effector.

6. The end of arm tool of claim 1, wherein the rotating plate is rotated in a semi-circular rotational motion by one of a pneumatic actuator or an electric motor.

7. The end of arm tool of claim 4, wherein the plurality of end effectors are oriented at one of the plurality of different angles with respect to a rotating surface of the rotating plate during a semi-circular rotational-motion.

8. The end of arm tool of claim 1, further comprises:
   a non-rotating plate with a second slot coupled to the rotating plate, wherein a portion of the end effector is inserted through the second slot, and wherein the first slot partially overlaps with the second slot.

9. The end of arm tool of claim 8, wherein the first slot is an angular slot and the second slot is a linear slot or vice-versa.

10. The end of arm tool of claim 1, wherein the characteristics of the object includes one of a size or shape of the object.

11. The end of arm tool of claim 4,
   wherein the second end of each of the end effector collectively forms a circular configuration when the first end of each of the end effector is inserted through the rotating plate, and
   wherein the rotating plate is adjusted to change a diameter of the circular configuration based on the characteristics of the object to be handled by the plurality of end effectors.

12. The end of arm tool of claim 1, wherein the rotating plate is capable of one of an incremental movement or a decremental movement.

13. The end of arm tool of claim 5, further comprises:
   wherein the supporting plate acts as a fulcrum point for the end effector.

14. A robotic manipulator system, comprises:
   a vision system to:
      transmit an input data indicative of characteristics of an object to be handled by the robotic manipulator system; and
   an end of arm tool, comprising:
      a rotating plate with an angular slot;
      an end effector inserted through the angular slot with a clearance to move the end effector within the angular slot;
      a supporting plate positioned between one end of the end effector and the rotating plate, wherein the end effector is inserted through an aperture in the support plate; and
      a controller communicably coupled to the vision system, wherein the controller is configured to:
         adjust the rotating plate to alter an orientation of the end effector relative to a plane of the rotating plate to position the end effector at one of a plurality of different angles based on the input data received from the vision system.

15. The robotic manipulator system of claim 14, wherein the vision system is further configured to:
   capture an image of the object to be handled by the end of arm tool.

16. A method for operating an end of arm tool comprising:
   rotating a rotating plate to alter an orientation of an end effector relative to a plane of the rotating plate, wherein the end effector is inserted through an aperture in a support plate, and wherein the support plate being positioned between an end of the end effector and the rotating plate; and
   positioning the end effector at one of a plurality of different angles based on characteristics of an object to be handled by the end effector.

17. The method of claim 16, wherein adjusting the rotating plate further comprises:
   subjecting the rotating plate to a semi-circular forward and reverse rotational-motion.

18. The method of claim 16, further comprises:
receiving an input data related to characteristics of the object to be handled by the end effector, wherein the characteristics includes at least one of a size or shape of the object.

19. The method of claim 16, wherein altering the orientation of the end effector further comprises:
altering a first end of the end effector to a first configuration and a second end of the end effector to a second configuration.

20. The method of claim 16, wherein altering the orientation of the end effector further comprises:
changing a diameter of a circular configuration formed collectively by a second end of the end effector.

* * * * *